United States Patent [19]
Armellin

[11] Patent Number: 5,975,175
[45] Date of Patent: *Nov. 2, 1999

[54] PAIR OF HIGH-TRANVERSE-CURVATURE TIRES FOR TWO-WHEELED VEHICLES HAVING DIFFERENT BELT STRUCTURES AND METHOD OF CONTROLLING THE BEHAVIOR OF SUCH VEHICLES ON A BEND

[75] Inventor: Giancarlo Armellin, Nova Milanese, Italy

[73] Assignee: Pirelli Coordinamento Pneumatici S.P.A., Milan, Italy

[ * ] Notice: This patent is subject to a terminal disclaimer.

[21] Appl. No.: 08/857,305

[22] Filed: May 16, 1997

[30] Foreign Application Priority Data

May 22, 1996 [IT] Italy .................................. MI96A1026

[51] Int. Cl.⁶ ............................... B60C 3/00; B60C 9/18; B60C 9/20; B60C 9/22
[52] U.S. Cl. .................... 152/454; 152/209.11; 152/458; 152/526; 152/527; 152/531; 152/533
[58] Field of Search ................................... 152/454, 527, 152/531, 533, 526, 458, 209.11

[56] References Cited

U.S. PATENT DOCUMENTS

| | | |
|---|---|---|
| 4,112,994 | 9/1978 | Mills et al. . |
| 4,140,168 | 2/1979 | Caretta . |
| 4,293,019 | 10/1981 | Maiocchi . |
| 5,032,198 | 7/1991 | Kojima et al. . |
| 5,355,926 | 10/1994 | Takase . |
| 5,396,943 | 3/1995 | Takase . |
| 5,407,006 | 4/1995 | Giancola et al. . |
| 5,562,792 | 10/1996 | Caretta . |

FOREIGN PATENT DOCUMENTS

| | | |
|---|---|---|
| 0235579 | 9/1987 | European Pat. Off. . |
| 0280889 | 9/1988 | European Pat. Off. . |
| 0329589 | 8/1989 | European Pat. Off. . |
| 0346047 | 12/1989 | European Pat. Off. . |
| 0520814 | 12/1992 | European Pat. Off. . |
| 0565339 | 10/1993 | European Pat. Off. . |
| 0718122 | 6/1996 | European Pat. Off. . |
| 56-71604 | 6/1981 | Japan . |
| 2157239 | 10/1985 | United Kingdom . |
| 2283215 | 5/1995 | United Kingdom . |

OTHER PUBLICATIONS

Patent Abstracts of Japan, vol. 017, No. 077 (M–1367) & JP 04–278891 A, Oct. 5, 1992.
Patent Abstracts of Japan, vol. 018, No. 304 (M–1619) & JP 06–064577 A, Mar. 8, 1994.
Patent Abstracts of Japan, vol. 018, No. 133 (M–1571) & JP 05–319019 A, Dec. 3, 1993.

*Primary Examiner*—Adrienne C. Johnstone
*Attorney, Agent, or Firm*—Stevens, Davis, Miller & Mosher, L.L.P.

[57] ABSTRACT

A pair of high-transverse-curvature tires for two-wheeled vehicles is provided, in which the belt structure of the rear tire comprises a layer of inextensible cords disposed at a substantially zero angle with respect to the equatorial plane of the tire, preferably wound on a sheet of elastomeric material reinforced with aramid pulp, whereas the belt structure of the front tire comprises at least one radially outer layer of inextensible cords disposed at a substantially zero angle with respect to the equatorial plane of the tire and distributed with an axially variable density, and preferably another reinforcing layer at a radially underlying position. The zero-degree cords preferably are metallic cords of the high-elongation type, made of high-carbon steel. In the belt structure of the front tire the distribution density of the cords preferably continuously increases from the center to the belt ends, starting at the ends from a value of about 6 cords/cm at an area of a width included between 10% and 30% of the axial extension of the belt disposed on either side of the equatorial plane.

21 Claims, 3 Drawing Sheets

PAIR OF HIGH-TRANVERSE-CURVATURE TIRES FOR TWO-WHEELED VEHICLES HAVING DIFFERENT BELT STRUCTURES AND METHOD OF CONTROLLING THE BEHAVIOR OF SUCH VEHICLES ON A BEND

FIELD OF THE INVENTION

The present invention relates to two-wheeled vehicles and more particularly to a pair of tires of high transverse curvature, in particular for equipping motor-vehicles, to one of the tires forming said pair, the front one in particular, and to a method of controlling the vehicle behavior through said pair.

The invention is particularly directed to a pair of tires for two-wheeled vehicles in which the transverse curvature, at all events of a value not lower than 0.15, in the front tire is higher than in the corresponding rear tire.

Still more particularly, the invention is concerned with the structure of the pair of tires; in other words, the invention relates to a pair of tires provided with a carcass of radial structure, preferably having a shape ratio (H/C)≦80% and/or mounted on a mounting rim the width of which is ≧60% of the nominal cord of the tire.

BACKGROUND DISCUSSION

It is known that when a two-wheeled vehicle takes a curvilinear trajectory, it tilts on its side internal to the bend forming an angle defined as "camber" angle, the value of which can reach 65° with respect to the vertical plane of the ground; due to this operation, tires give rise to a camber thrust counteracting the centrifugal force acting on the vehicle.

Originally, tires had a carcass structure comprising a pair of plies of rubberized fabric reinforced with cords symmetrically inclined to the equatorial plane of the tire, usually known as cross-ply carcass structure, and optionally a belting structure also made of pairs of rubberized fabric strips with cords angled to the equatorial plane of the tire.

This carcass structure was capable of developing important camber thrusts; in addition, the tire pair had a very homogeneous behavior on a bend in that although the two tires had different sizes, they exerted qualitatively similar camber thrusts which were largely sufficient to balance the centrifugal thrust acting on the vehicle.

Driving the vehicle on a bend therefore was not particularly difficult, in that the vehicle had neutral driving characteristics so that a driver could take a curvilinear trajectory almost instinctively, by merely tilting the vehicle, without making adjustments to the attitude thereof, in particular the steering angle of the handlebar.

In confirmation of the above, motorcyclists surely can remember that they could go along a bend without holding the handlebar with their hands, but by merely moving their own center of gravity.

In contrast, problems existed in terms of ride comfort, stability, vehicle roadholding and driver fatigue, connected with an excessive stiffness of the tires. The tire structure, under the effect of an imposed deformation, stores up spring energy that is instantaneously returned when stresses stop, thereby amplifying disturbances transmitted from the road surface, which results in loss of stability on the part of the vehicle. In particular when running takes place on a straight road, this excessive stiffness causes oscillations of high frequency (8–10 Hz) on the front tire at low speed (shimmy effect) and oscillations of lower frequency (3–4 Hz) on the vehicle at high speed, so that driving becomes precarious.

In an attempt to obviate these problems, the use of radial-carcass tires having a belt structure made of textile or metallic cords has been recently introduced. In particular, the rear tire is provided with a belt structure comprising (sometimes in an exclusive manner) winding of cords preferably of metal, oriented in a circumferential direction, whereas the front tire has a belt structure provided with radially overlapped strips of inclined cords.

Surely this pair of tires has improved the situation in terms of ride comfort and driving stability. Oscillations of the vehicle at high speed on a straight stretch practically have disappeared, in that the rear tire has an important damping effect, while the shimmy effect substantially remained unchanged.

The behavior improvement on a straight stretch however has triggered a new problem, namely, the radial structure of the tire, in combination with a belt of circumferentially disposed cords (at 0°) is unable to give rise to a camber thrust suitable for requirements, also taking into account the increasingly higher performance offered by vehicles.

More particularly, the rear tire furnishes a lower and qualitatively different thrust (that is of a linear type) than that (which is curvilinear) of the front tire. Consequently, the thus equipped vehicles have lost a neutral behavior and acquired an over-steering behavior. Thus, on a bend the rear wheel, unable to counteract the centrifugal force of increasing value acting on the axis, at a certain point skids, that is tends to come out of its trajectory moving to the outside of the bend whereas the front tire closes to the inside of the bend.

In other words, as the speed increases and the radius of curvature of the trajectory decreases, the vehicle inclination alone is no longer sufficient to compensate for the effect of the centrifugal force. Thus, the vehicle inclination is no longer sufficient for ensuring a running stability. Thus, increase in the thrust exerted by the tires is required and this increase is obtained by varying the vehicle attitude by an operation carried out by the driver by means of the handlebar, usually known to those skilled in the art as "push steer", that is by inclining the rolling plane of the front tire with respect to the tangential direction of the curvilinear trajectory through an angle, called "slip angle" directed in a direction opposite to the trajectory curvature.

Thus a full thrust is obtained which is the sum of a camber thrust resulting from the inclination of the equatorial plane of the tire relative to the vertical line and a slip camber caused by the angular variation of the rolling plane of the front wheel.

The value to be assigned to the slip angle depends on the structural and behavioral features of the front tire, that is on the link that the tire is capable of express between the slip angle value and the slip thrust value, in combination with its camber thrust and the thrust exerted by the rear tire.

On coming out of a bend, in contrast, an opposite operation is necessary, which is usually referred to by those skilled in the art as "pull steer": i.e. the handlebar is to be inclined to the inside of the bend so as to lift the motor-vehicle up and follow the rectilinear trajectory again. As a result of the above, the vehicle behavior is greatly conditioned by the tire pair with which it is equipped, which pair must be therefore conveniently selected and verified.

Attempts to facilitate this task have already been made. Patent EP 280,889 offers a method of carrying out this selection a prior without further experimental controls being required. In accordance with the teachings of this patent, if one defines as $\delta_1$ and $\delta_2$ the slip responses, that is those functions linking the slip angle with the slip thrust for the front and rear tires respectively, tire pairs for which function $\delta_2-\delta_1$ appears to be an increasing monotonic function of the vehicle shift angle will be acceptable.

Actually the method does not solve the problem because the slip response also depends on the inflating pressure of the tire and in any case the result does not have an absolute value. In fact, there were pairs of tires that came out to be unacceptable in spite of the fact that they complied with the stated rule and vice-versa.

SUMMARY OF THE INVENTION

In accordance with the invention the Applicant has now conceived that there was a different way of solving the problem arisen with these new tires. This way does not involve accepting the existence of the problem and trying to select in the most efficient manner only those tires, among a great number of front and rear tires, that lend themselves to form an acceptable pair or combination for equipping the vehicle Rather it involves planning the structure of the tire pair so as to avoid the arising of the problem itself, and thus give back a neutral behavior on a bend to the vehicle equipped with the tire pair of the invention, as well as the capability of absorbing shocks and damping vibrations.

In a first aspect, the invention relates to a method of controlling the overall slip thrust in a pair of tires mounted on a motor-vehicle, and more particularly a method of controlling the behavior of a motor-vehicle through the structure of its tires, and preferably a method of controlling the slip thrust exerted by the motor-vehicle along curvilinear trajectories by varying the thickness or density of the reinforcing cords of a layer of cords disposed circumferentially, at least in the belt structure of the front tire.

In a second aspect, the invention relates to a tire for two-wheeled vehicles comprising a radial carcass of toric form having a curvature ratio not lower than 0.3, provided with a belt comprising at least one radially outer layer of circumferential coils of reinforcing cords, distributed axially with a varying density from one end to the other of said belt.

In a further aspect the invention also relates to a pair of tires for two-wheeled vehicles, the tires comprising a radial carcass of toric form of high transverse curvature, having a central crown and two sidewalls terminating with a pair of beads for anchoring the tire to a corresponding mounting rim, a tread band applied crown-wise to said carcass and a circumferentially inextensible belt structure, interposed between said carcass and tread band, characterized in that:

the belt structure of the rear tire comprises at least one radially outer layer formed of a plurality of axially side-by-side circumferential coils of wound cords having a substantially zero angle with respect to the equatorial plane of the tire, the belt structure of the front tire comprises at least one radially outer layer provided with a plurality of cord coils, disposed at a substantially zero angle with respect to the equatorial plane of the tire, axially distributed with a varying density from one end to the other of said belt, and preferably at least one additional reinforcing layer disposed at a radially inner position.

Preferably the tires of the pair have a curvature ratio not lower than 0.3, the rear tire having a curvature ratio lower than the front tire.

Conveniently, the radially outer layer of cords in the belt structure of the rear tire is formed of a single cord or a narrow band of rubberized fabric comprising 2 to 5 metal cords, of the high-elongation type, spiraled on said carcass, from one end to the other of said crown portion, according to an angle of a substantially zero value with respect to the equatorial plane of the tire.

As regards the front tire, conveniently the cord coils of the radially outer layer of the belt structure comprise metal cords of the high-elongation type, distributed with a progressively increasing density from the equatorial plane to the belt ends, being of a value not exceeding 8 cords/cm in a region of predetermined width disposed on either side of the equatorial plane.

Preferably, the cord coils of at least one of said layers are wound on another reinforcing layer in a radially inner position that, in a first embodiment, is a sheet of elastomeric material, located between the cord coils and the carcass ply, optionally filled with bonding means dispersed in the material.

Alternatively, in accordance with different versions, the radially inner layer, preferably in the belt structure of the front tire, can comprise two strips disposed axially in side by side relation, provided with reinforcing elements oriented in inclined directions in each strip and in opposition to each other in the two strips relative to the equatorial plane of the tire, or two radially overlapped strips, on each side of the equatorial plane, provided with reinforcing elements oriented in inclined directions in each strip and in opposition to each other in the two strips relative to the equatorial plane of the tire.

Conveniently, the reinforcing elements of the radially inner layer are selected from the group comprising textile cords and metallic cords. In addition the reinforcing elements in one of the strips can be of a different material than that of the reinforcing elements of the adjacent strip in a radial direction.

As regards the radially inner layer consisting of a sheet of elastomeric material, the bonding means dispersed in the elastomeric matrix are preferably short aramid fibril-structure fibers homogeneously distributed in said elastomeric matrix with a density per unit volume included between 0.5% and 5% of the overall volume, and most preferably oriented along a preferential direction which is circumferential or inclined to the equatorial plane.

Advantageously, and in any embodiment, the radially inner layer can be broken at the equatorial plane of the tire over a portion of a width preferably included between 10% and 30% of the axial extension of the belt.

BRIEF DESCRIPTION OF THE DRAWINGS

The present invention will be better understood with the aid of the following description and the accompanying figures, given by way of illustration only and not in a limiting sense, in which.

DETAILED DESCRIPTION OF THE PREFERRED EMBODIMENTS

Figure 1:
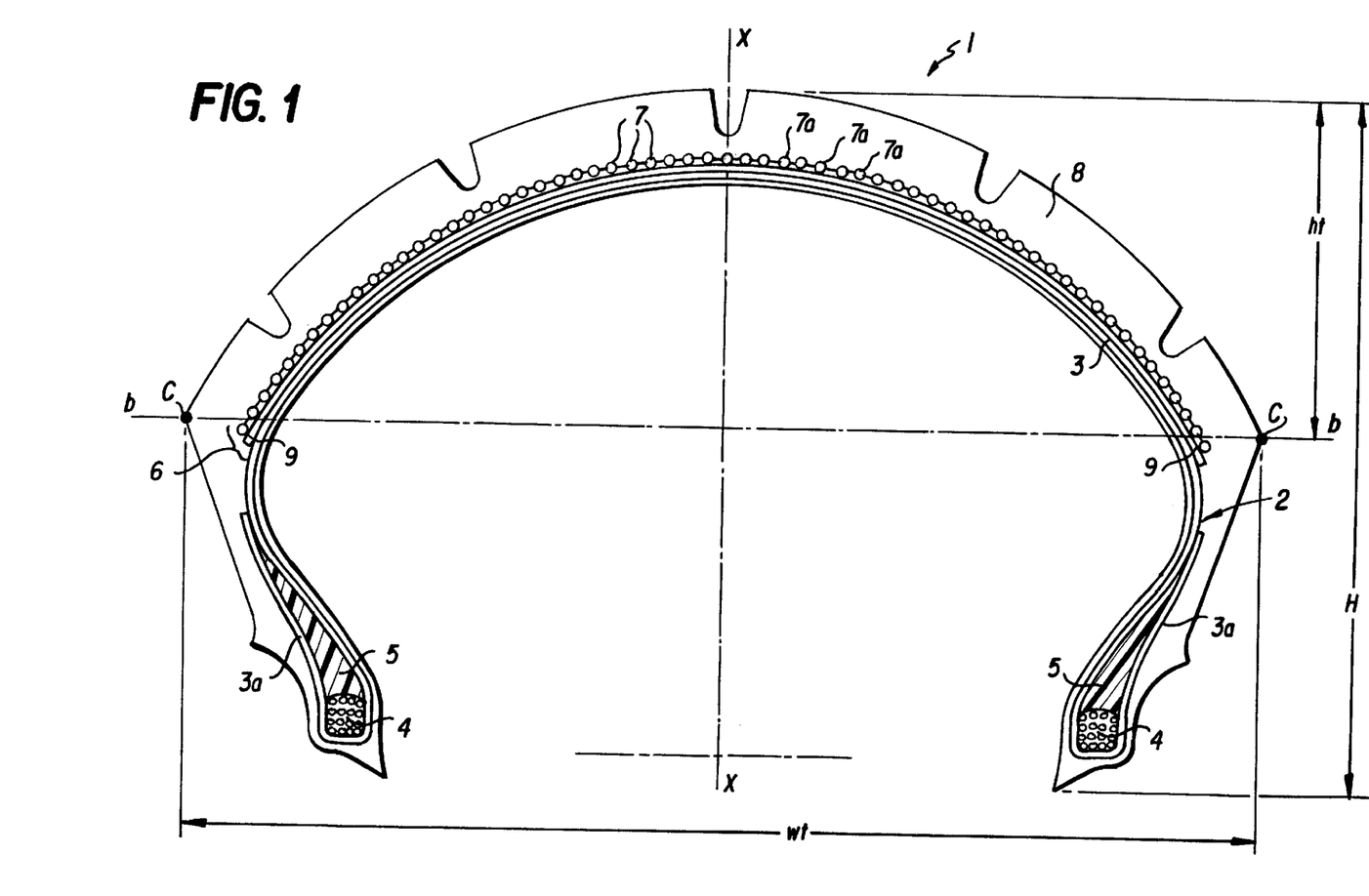
FIG. 1 is a cross-sectional view of the tire profile for a rear wheel, in a pair of tires in accordance with the invention.

With reference to FIG. 1, a high-transverse-curvature tire in particular for rear wheels in motor-vehicles in accordance with the invention has been generally identified by reference numeral 1.

As known, the transverse curvature of a tire is defined by the particular value of the ratio between the distance ht of the tread center from the line b—b passing by the tread ends C, measured on the equatorial plane X—X, and the distance wt between said tread ends. As also known, in tires for two-wheeled vehicles it has a very high value, usually higher than 0.15, against a value usually lower than 0.05 in tires for motor-vehicles.

If the tread ends cannot be easily identified, due for example to the lack of a precise reference such as the corner denoted by C in FIG. 1, it is surely possible to take as the distance wt a measure of the maximum chord in the tire.

The value of said transverse curvature is referred to as "curvature ratio" or, as usual, "tread camber".

In the tire of the invention this value is preferably included between 0.15 and 0.45.

The tire 1 comprises a carcass structure 2 comprised of at least one carcass ply 3 the opposite side edges 3a of which are turned back over corresponding bead cores 4. Applied to the outer perimetric edge of the bead cores 4 is an elastomeric filling 5 occupying the space defined between the carcass ply 3 and the corresponding turned-back side edge 3a of the carcass ply.

As known, the tire area comprising the bead core 4 and filling 5 forms the tire bead, designed to enable anchoring of the tire to a corresponding mounting rim, not shown.

Associated with the carcass is a belt structure 6 substantially consisting of one or more cords 7, disposed parallel and consecutively in side by side relationship, from one end to the other on the carcass crown portion, to form a plurality of circumferential coils 7a substantially oriented in the rolling direction of the tire, usually referred to as "at zero degrees" with reference to its lying with respect to the equatorial plane of the tire. Preferably, this belt is formed of a single cord or a narrow band of rubberized fabric comprising as many as five side by side cords, spiraled from one end to the other on the carcass crown portion.

Still more preferentially, this cord is a well-known metallic cord of the high-elongation (HE) type the use and features of which have already been widely described in the European Patent EP 0 461 646 of Pirelli for example, to which please refer for more details.

In short, these cords consist of a number of strands, 1 to 5, preferably between 3 and 4, each strand being formed of a given number of individual wires, 2 to 10, preferably 4 to 7, having a diameter greater than 0.10 mm, preferably in the range of 0.12–0.35 mm. The wires in the strands and the strands in the cord are helically wound together in the same direction, and the winding pitches may be the same or different for the wires and the strands.

Preferably, these cords are made of high-carbon steel wires (HT wires), that is containing more than 0.9% carbon. In particular, in a specific prototype prepared by Pirelli, the helical winding of layer 9 is formed of a single cord 7, known as 3×4×0.20 HE HT cord, spiraled from one end to the other of the belt. The indication defines a metal cord wound in one direction, formed of three strands, each consisting of four elementary wires of a diameter of 0.20 mm: as known, abbreviation HE means "high elongation" and abbreviation HT means "high tensile" steel, that is high-carbon steel.

These cords have an ultimate elongation included between 4% and 8% and a typical, well-known behavior to traction, referred to as "spring behavior", particularly necessary for the conformation and molding of these tires of high transverse curvature.

Obviously the preferential use of metal cords does not exclude the possibility of employing other cords, in particular, and by adopting appropriate expedients if necessary, the use of the also well-known textile cords of aramid fiber, as well as a combination of both: by way of example one could start with a layer of zero-degree cords comprising textile (aramid) cords at a central position and metallic (HE) cords at the adjacent side portions and vice versa. As regards the different cord-spiraling techniques over the carcass, they are well known too and are not herein illustrated.

In known manner, applied to the belt structure 6 is a tread band 8 by which contact of the tire with the ground occurs.

As shown in FIG. 1, coils 7a formed of the cord 7 are preferably wound on an auxiliary support element 9 substantially consisting of a sheet of elastomeric material interposed between the cord layer 7 and carcass ply 3.

This auxiliary support element 9 performs different useful functions. First of all, during the belt preparation step, due to its adhesive character and structural resistance, it keeps coils 7a formed of cord 7 conveniently connected together, giving the belt 6 sufficient structure stability during its manufacture and the subsequent manipulating steps preceding assembling of said belt with carcass 2. When vulcanization has been completed, in the tire in use the presence of the auxiliary element 9 brings about further benefits as regards the behavioral features of the tire, and in particular it increases its thrust capability in slip. It is therefore convenient that the auxiliary support element 9 should be as thin as possible so as to conveniently limit its weight. Since the support element is disposed in the tire areas of maximum radius, this weight takes a great importance in terms of generation of centrifugal forces.

In accordance with the present invention, to enable the manufacture and use of auxiliary support elements 9 of suitably reduced thicknesses, it is conveniently proposed that the blend constituting the auxiliary element (preferably a natural-rubber-based blend containing carbon black in an amount included between 30 and 70 phr) be provided with a homogeneously dispersed reinforcing filling. This filling consisting of bonding means, adapted to increase the mechanical-resistance and stretchability features of the elastomeric material in a raw state, without substantially altering the adhesiveness characteristics thereof. In this field, the so-called aramid pulp (short fibril-structure fibers of poly-para-phenylene-terephthalamide) appears to be preferred, of the type commercially known as KEVLAR and TWARON (KEVLAR and TWARON being registered trademarks of Du Pont and Akzo, respectively).

The elastomeric material reinforced with the aramid pulp in a raw state has an ultimate tensile strength included between 3 and 7 MPa with an elongation of 50% at a tensile stress included between 0.6 and 3 MPa.

It has been found that in the presence of aramid fibers dispersed in the elastomeric material blend forming the auxiliary support element 9, this element can be made in the form of a very thin sheet, which is however resisting both to plastic deformations and stresses induced therein during the manufacture of the raw tire.

In more detail, it has been found that the best results are achieved by introducing the aramid pulp into the elastomeric raw blend in an amount included between 1 and 10 phr (parts by weight per 100 parts of rubber) and using fibers of a length included between 0.1 and 2.5 mm. Practically, in the tire manufacture, an auxiliary support element 9 of a thickness included between 0.075 and 0.5 mm, preferably in the order of 0.25 mm or less can be produced and used.

Resistance to the different stresses can be further increased by making the auxiliary element 9 by calendering, so that the aramid fibers are previously oriented in a preferential direction in the elastomer sheet forming the auxiliary element itself. This preferential direction can be, at least for use in the tires in the pair of the invention, the transverse direction of the tire, although excellent results can be achieved if orientation takes place in the longitudinal direction.

Figure 2:
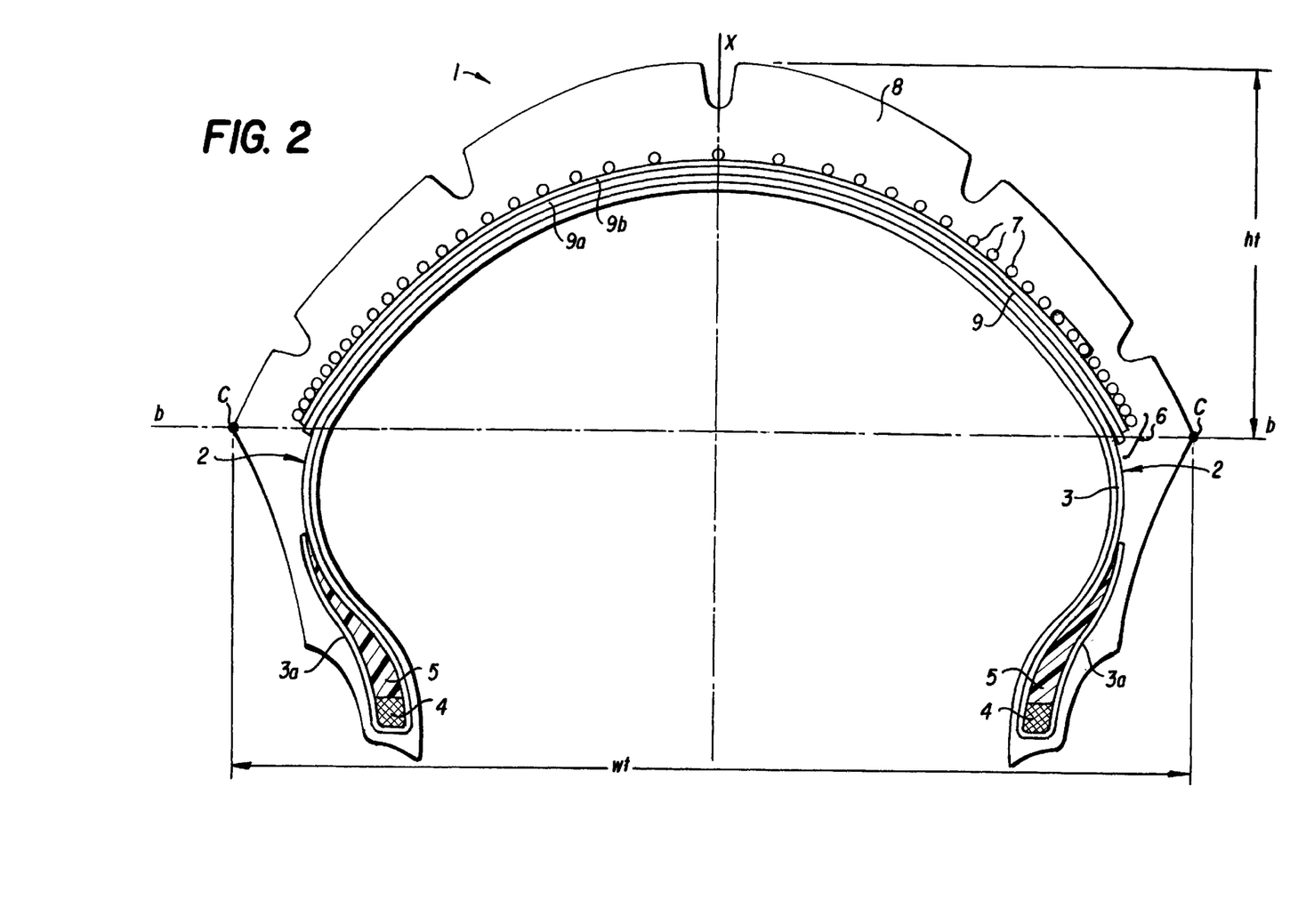
FIG. 2 is a cross-sectional view of the tire profile for a front wheel, in a pair of tires in accordance with the invention.

Identified by 1 in FIG. 2 is a high-transverse-curvature tire of a pair of tires for equipping two-wheeled vehicles, in particular adapted for mounting to the front vehicle wheel.

As is known, for the vehicle to have a good steering property and stability, the front tire must have a reduced width in section, and it is from this fact that the high transverse curvature of the tread originates.

The value of this curvature in the front tire of a pair in accordance with the invention is preferably greater than 0.30 and, more preferentially, greater than the value of the corresponding rear tire.

In its most general structure and for its features not expressly described herein, the tire of FIG. 2 does not differ from that in FIG. 1, so that it is illustrated without changing the numeral references used in said preceding figure.

The front tire also comprises a belt structure 6 applied crown-wise to the carcass and comprising at least one radially outer layer 7 of reinforcing elements oriented in a circumferential direction. Preferably, this belt 6 also comprises at least one radially inner reinforcing layer 9. This radially inner reinforcing layer substantially corresponds to the auxiliary support element 9 in the rear tire, except for the fact that in the front tire a greater structural complexity can be present.

Preferably, the reinforcing elements of the radially outer layer are cords of the same type as provided for the rear tire belt, described above, wound on the carcass in a circumferential direction, that is at 0°.

In this case too the radially outer layer is formed of a plurality of coils, preferably of at least one cord or narrow band of few (preferably 2 to 5) cords spirally wound on the carcass crown portion. However, winding is preferably carried out at a variable pitch, and at all events at a variable density, gradually increasing from the center to the belt ends.

In spite of the fact that spiraling in itself and the pitch variability involve a non-zero winding angle, the value of this angle keeps to such a low value that it substantially can be always considered as a zero-degree angle. In particular, to the ends of the present invention, angles of a value not exceeding 5° and preferably not exceeding 3° can be considered as "substantially equal to 0°". It is also pointed out that a winding pitch which is constant along the perimetric extension of the belt, by effect of the carcass curvature, at all events gives rise to a variable density in an axial direction.

In accordance with the invention the distribution density of the coils of cord 7 progressively varies along the layer, from the equatorial plane to the ends, preferably in accordance with a predetermined relation. Based on the inventor's experiments, this relation can conveniently be described by the expression:

$$Nx = K \frac{R^2}{r^2} No$$

wherein:

No is the number of cord coils disposed in a central length of unit value, 1 cm for example, on either side of the equatorial plane;

R is the distance between the center of the central length in the radially outermost layer and the rotation axis of the tire;

r is the distance between the center of one of the unit lengths located in the area included between the center and the ends of the radially outermost layer and the rotation axis of the tire;

K is a parameter considering the constituent material and the formation of the cords, as well as the amount of rubber on the cord, and the weight of the portion of the radially innermost layer close to the unit length, which varies when variations occur in the material type and structural features of the belt strips along the crown profile, that diverge from the reference values.

This parameter will take a value substantially around 1 in the case in which the cords have the same formation and all connected materials are the same over the whole extension of the layers and different values in connection with variations in the materials and in the formation of the reinforcing elements along the perimetric extension of the belt.

A cord distribution in accordance with this relation ensures evenness in the stress acting on the belt structure when the tire is in use, as a consequence of the applied centrifugal force, in spite of the axial density variation of the cords at 0°, which is necessary for achieving a differentiated stiffness in an axial direction, as clarified later.

Obviously, a person skilled in the art will be able to find other relations that, depending on the above stated planning variables, will enable him to simultaneously achieve a differentiated stiffness in the axial direction and a stress evenness in the belt structure of the tire in use, by varying the density of the cords in a controlled and predetermined manner.

Still, a person skilled in the art will be able to use the above described methodology for the manufacture of the rear-tire belt as well as the belts of both tires, so as to combine the different features of the two tires together for the purpose of achieving the neutral behavior of the motor-vehicle in slip.

As regards density of the cords at 0° at the area located on either side of the equatorial plane, where maximum thinning out occurs, preferably it does not exceed 8 cords/cm and most preferably it is included between 3 and 6 cords/cm.

The width of the area is preferably included between 10% and 30% of the axial extension of the belt.

Conveniently, the amount of cords in the central area is equal to a value between 60% and 80% of the amount of cords close to the tire shoulders, where density of the cords preferably does not exceed 10 cords/cm and is more preferably included between 6 and 8 cords/cm.

We are now going to consider the radially inner layer. Different alternative embodiments are possible for its manufacture, among which a person of ordinary skill in the art will be able to select the most appropriate one, depending on the specific requirements.

The reinforcing elements of the radially inner layer can be individual wires or cords of any appropriate material, in any case always oriented in a crossed direction with respect to the equatorial plane, or reinforcing fillings such as fibrous fillings, disposed randomly but preferably oriented in a preferential direction which may be parallel or inclined to the equatorial plane.

In a convenient manner, the reinforcing elements of the layer are monofilaments and/or twisted or untwisted yarns and their cords, either of a multiplicity of textile materials such as natural fibers like rayon or cotton, or synthetic materials such as polyamide, nylon and aramid for example, or metal materials.

It is pointed out that in the following of the present description the term "cords" will be always used, by this term also meaning the individual elementary wires or untwisted yarns, when the text enables it.

Figure 3:
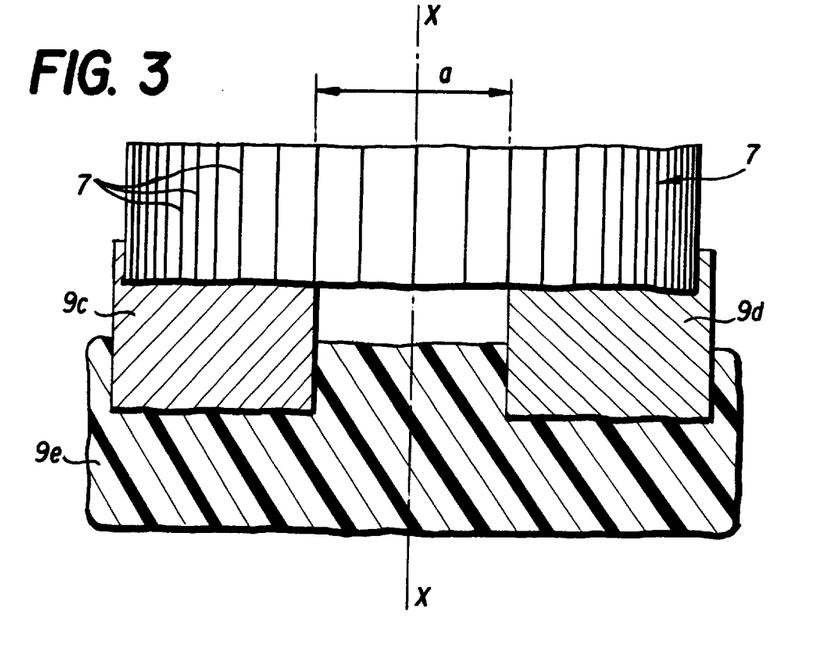
FIG. 3 shows different alternative embodiments of the belt structure of a tire for a front wheel, in a diagrammatic exemplary plan view.

First of all, the layer may comprise two radially overlapped strips 9a, 9b of rubberized fabric consisting of reinforcing elements incorporated in an elastomeric matrix, oriented in two preferential directions crossing each other in the two strips and preferably symmetrically inclined to the equatorial plane X—X, in a manner substantially similar to the traditional belt of the known art.

The substantial difference between the new belt and the last mentioned belt is represented by the lower stiffness of the new belt at a large area a (included between 10% and 30% of the axial extension of the belt) on either side of the equatorial plane. This lower stiffness can be conveniently obtained by acting either on the density of said reinforcing elements, or on the constituent material, or on the orientation of the elements with respect to the equatorial plane, or on any other combination of said measures. This stiffness value can be expressed in different ways, by the density of the reinforcing elements for example (all other conditions being equal). However, more generally, the stiffness value is expressed by the modulus of elasticity or the tensile stress of the radially inner belt layer measured in the circumferential direction of the tire. The layer will preferably have a stiffness not exceeding 65% of the stiffness of the equivalent belts in the known art.

In particular, the material, structure and lying angles being equal, the overall density of the reinforcing elements crossing a right section of unit width, on either side of the equatorial plane, in a direction oblique to said plane, does not exceed and preferably is lower than the usual density of the elements of the traditional belt, in the order (as known) of 14 cords/cm.

The angles formed by said cords with respect to the equatorial plane are included between 18° and 50° and preferably between 22° and 45°.

In accordance with a preferred alternative version, the strips are broken at the equatorial plane, thus creating an area a (FIG. 3) of a width included between 10% and 30% of the axial extension of said belt, in which only circumferentially-directed reinforcing cords 7 are present.

The above described solution has the advantage that appropriate density values of the strips can be selected for the side portions of the belt structure without correspondingly thickening the central crown portion of the belt structure.

In particular, with nylon cords title 940/2, density values included between 4 and 8 cords/cm have been found convenient, in combination with orientation angles with respect to the radial direction included between 30° and 50°.

In a particular preferential embodiment, both strips are comprised of cords of the same material, whereas in a further embodiment the cords of one strip are of a different material than those of the other strip, selecting nylon/aramid or aramid/metal couplings. For example, in this case the angles of the cords included within the above specified range, are preferably different from each other and non-symmetric.

In an alternative solution the radially inner layer is formed of two strips alone, disposed axially in side by side relation along the perimetric profile. Each (9c, 9d) of the strips being provided with reinforcing elements oriented in a crossed direction inclined to the equatorial plane, so that the two strips give rise to a configuration of the reinforcing elements substantially in the form of a fishbone. In this case too the two side by side strips can be maintained close to each other or also jointed along the facing longitudinal edges, or completely separated from each other. Then, keeping the same axial width between the facing edges, as pointed out beforehand in the case of the overlapped strips, appears to be useful.

The above considerations in connection with the constituent material, orientation and density of the reinforcing elements of the two strips apply to the just described individual strips as well.

In a further advantageous embodiment of the invention, the radially inner layer is formed of a sheet 9e of elastomeric material, such as sheet 9 in the rear tire, which is axially continuous or broken at the equatorial plane X—X as in the case of the already described strips 9c, 9d. Preferably, this sheet is filled with a reinforcing filling consisting of short discontinuous fibers, which may be randomly dispersed within the elastomeric matrix but more preferably are oriented in a predetermined direction. This predetermined direction may be circumferential, axial or conveniently inclined with respect to the equatorial plane X—X of the tire, symmetrically to the equatorial plane, when the sheet 9e is formed of two distinct and axially adjacent sheets.

In these cases it is no longer possible to speak of linear density of the fibers but it is necessary to consider their distribution density per unit volume. This density is preferably included between 0.5% and 5% of the overall volume. The thickness of the sheet does not exceed a 1 mm value and is preferably included between 0.3 and 0.8 mm.

Conveniently, the reinforcing fillings are the same as those already mentioned and proposed for use in the support element 9 of the belt layer in the rear tire.

Figure 4:
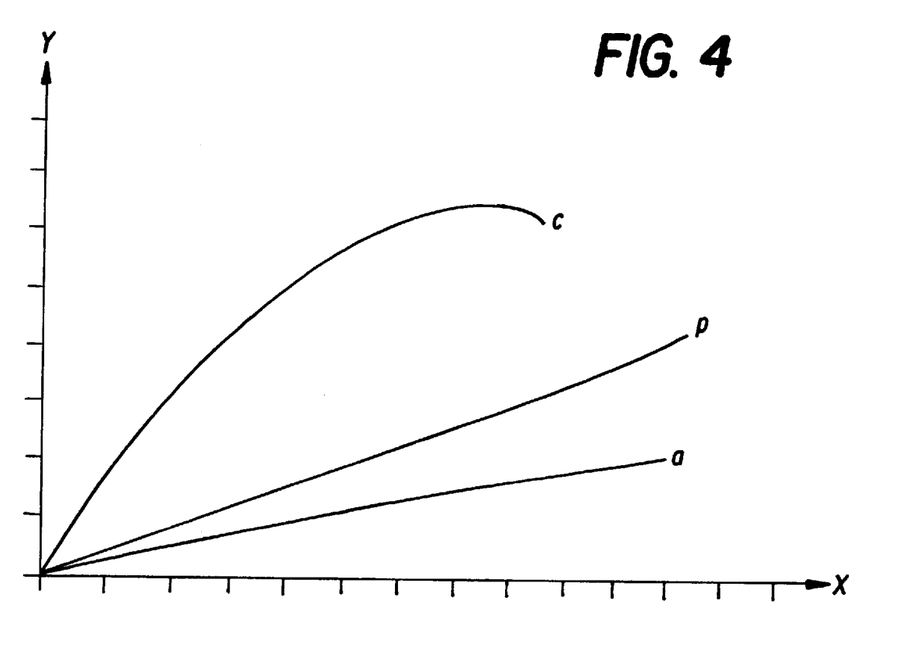
FIG. 4 is a qualitative diagram of the combination of slip thrusts and camber thrusts in the two tires of said pair and a known front tire.

FIG. 4 shows the combination of the slip thrusts and camber thrusts exerted by the tire, for some tires and in a qualitative manner. This combination, represented in a Cartesian diagram, is expressed in kilograms (Y-axis of ordinates) on varying of the inclination angle of the motor-vehicle, expressed in degrees (X-axis of abscissas) for standardized operative pressures, rated loads and mounting rims of normal use in motor-vehicles. Straight lines a and p represent said function for the front and rear tires respectively of one pair in accordance with the invention.

In contrast, line c represents the combination of the slip thrusts and camber thrusts exerted by the front tire of the state of the art, having a belt formed of crossed-cord strips.

It is possible to see that this combination is a curvilinear function, combination of which with the substantially rectilinear function of the rear tire gives rise to a function which is still curvilinear.

This substantially means that a vehicle equipped with the combination of front and rear tires identified by behaviors according to lines a and c has a behavior on a bend which varies with its inclination with respect to the road surface, since the thrust combination in the two tires is not linear, in that it is a combination of a linear thrust (rear tire) with a non-linear thrust (front tire): therefore a continuous adjustment of the vehicle attitude is required.

As can be seen, thrusts a and p are, in contrast, qualitatively identical functions, in particular substantially rectilinear functions, so that their combination as well is a substantially rectilinear function of a variable value in a continuous and uniform manner with the vehicle inclination. The vehicle therefore has a neutral behavior to steering on a bend, that is practically it does not require adjustments to the handlebar but only a progressively increasing inclination with the increase of the centrifugal force.

EXAMPLES

In order to evaluate the qualitative results achieved with the pair of tires in accordance with the invention, a series of road and track tests were executed, and the tire pair of the invention was compared with equivalent tire pairs, that is sold for the same type of vehicle and use, of the best brands available on the market.

These tires were tires of usual production manufactured by Pirelli and tires of two different manufacturers, judged as the best of the competitors' tires, under normal-drive and top-limit-drive conditions, respectively.

The features of the used vehicle are the following:

| | |
|---|---|
| MOTOR-CYCLE | HONDA CBR 1000 F |
| Front tire | size 120/70 ZR 17 |
| inflation pressure | 2.5 bars |
| rim | 3.50 - 17 |
| Rear tire | size 170/60 ZR 17 |
| inflation pressure | 2.9 bars |
| rim | 5.50 - 17 |

The road test consisted in evaluating the qualitative level of the most important behavioral features on driving especially depending on the belt structure, giving a subjective judgement, converted to a score varying from 1 to 7, awarding the maximum score to the tire pair showing the best behavior in each of the considered features. The tires are identified as follows:

A—PAIR OF TIRES OF THE INVENTION
B—PAIR OF TIRES PIRELLI (Current production; MTR 01; MEZ2)
C—FIRST PAIR OF TIRES FROM COMPETITION
D—SECOND PAIR OF TIRES FROM COMPETITION It is to note that the effects of the individual structural and behavioral features of the different compared tires, which tires differ from each other for more than one feature are not evaluated separately, but it is assessed the only overall behavior of the tire equipment, influenced by all features of the finished product, although mainly by the belt structure type of the two tires. On the other hand, the test exactly aimed at assessing the overall result of the tire pair of the invention compared with the best tires equipments present on the market.

At all events, the tires forming the pair of the invention were manufactured as follows.

the front tire had a radial two-ply carcass with rayon (title 1220/2) cords, and a belt consisting of a radially outer layer and an axially continuous radially inner layer. The radially outer layer being of metallic cords 3×4×0.20 HE HT, ultimate elongation value corresponding to 6%. These cords were distributed in an increasing variable density starting from the minimum value of 4 cords/cm at the equatorial plane, until a maximum value of 8 cords/cm at the shoulders, obtained by spiraling a narrow band of two cords, as previously described. The axially continuous radially inner layer, thickness 0.5 mm, being of a blend filled with aramid pulp oriented in a circumferential direction.

The rear tire had a radial two-ply carcass with nylon (title 1400/2) cords and a belt layer formed of a narrow band of three steel cords, type 3×4×0.20 HE HT, ultimate elongation value corresponding to 6%. The steel cords were spiraled over the carcass at an axial winding pitch of 5 mm, under a tension of about 400 grams.

In contrast, of the comparative tires substantially identical with each other, the front ones had a radial two-ply carcass of nylon, and a pair of radially overlapped belt strips provided with cords of aramid, symmetrically crossed with each other in the two strips, distributed with a density corresponding to 9 cords/cm and inclined at an angle of 23° with respect to the equatorial plane. According to the state of the art, all these values were measured crown-wise to the tire. The rear tires were provided with a nylon two-ply carcass and a belt consisting of the circumferential winding of an aramid cord spiraled with a different density depending on the tires, of 130 and 160 threads/dm.

Reproduced in the following table is the result of the comparison between the different tire pairs.

TABLE

| TESTS/TIRES | A | B | C | D |
|---|---|---|---|---|
| SENSITIVITY TO SHIMMY | 7 | 5 | 5 | 4.5 |
| DRIVE BEHAVIOR | 7 | 6 | 6 | 6 |
| SHOCK-ABSORBING CAPABILITY | 7 | 6 | 6 | 5 |
| STEERING STABILITY | 7 | 7 | 6 | 5 |
| BRAKING BEHAVIOR | 7 | 5.5 | 4 | 4.5 |
| COMFORT | 7 | 6 | 6 | 5.5 |

It is possible to see that the pair of tires of the invention had a better performance level taken as a whole than the competitors'. In particular, the present invention had a better level not only as regards sensitivity to shimmy effect, but also a capability, corresponding to expectations, of absorbing road-surface unevenness, and in a surprising manner as regards behavior on braking, that is roadholding and braking distance.

The invention achieves all the intended purposes and in particular eliminates the shimmy effect and the poor absorption of the road unevenness by the front tire and the oversteering behavior and vehicle tendency to lift up on a bend in case of braking.

The pair of tires in accordance with the invention has completely recovered the neutral behavior of the vehicle on a bend, by virtue of the belt structure of the new front tire, provided with a zero-degree winding of cords conveniently thinned out at a central area: actually, this structure gives the tire a response of the linear type on a bend, i.e. a response qualitatively identical with that of the rear tire, so that the response combination of the two tires, that is the vehicle response on a bend, is still a response of a linear type, which results in a neutral behavior on driving.

In addition, this response is conveniently balanced between the two tires due to an overall reduction in the transverse stiffness of the front tire belt and can be further adjusted by a simultaneous increase of the transverse stiffness of the rear tire, to be achieved with the addition of the auxiliary support element of elastomer material reinforced with aramid pulp.

Surprisingly and contrary to all expectations, the stiffness reduction of the front tire belt, in combination with the behavioral features of the rear tire, by recovering the neutral behavior of the vehicle on a bend, has made the need for a high transverse stiffness of the belt at the side portions thereof no longer essential. This high transverse stiffness was previously necessary in order to support the slip thrusts caused by the slip angle imposed to the front tire, during running on a bend.

Thus, the use in the front tire of an inner reinforcing layer made of a single or double strip and preferably absent at the central tread portion for the purpose of better complying with a dual and conflicting requirement of a high flexibility of the belt under running conditions on a straight stretch and high stiffness during running on a bend, becomes optional, convenient for particular uses of the vehicle or specific tire structures. In fact, in the belt side portions, reinforcements oriented in a crossed direction with respect to the equatorial plane compensate for the stiffness reduction caused by the replacement of the usual belt strips made of crossed cords in which cords winding takes place at 0 degrees.

In particular, by acting on density values of the reinforcing elements taken as a whole and on the lying angles of the reinforcing elements of the lower layer, stiffness values of the belt differentiated from one area to another can be obtained. The stiffness values increase towards the belt end so as to absorb and damp vibrations due to ground unevenness, and simultaneously develop important transverse thrusts becoming increasingly bigger with the vehicle inclination, thus giving the tire excellent roadholding and great insensitivity to the shimmy effect, and also a high ride comfort for the driver.

It has also been unexpectedly found that the greater belt capability of being deformed allowed by the presence of a layer having zero-degree reinforcing elements, with grading of the density value of the elements in an axial direction, improves the vehicle stability on braking, both on a straight stretch and on a bend. This improvement occurs because forces acting on the two tires do not qualitatively change on changing of the speed and load acting thereon, in connection with the different running conditions. In particular, the load distribution between the front and rear tires undergoes a modification during the braking action, but this fact, when running takes place on a bend, does not generate a thrust discontinuity on the front tire with a 0° belt, which in contrast happens on a tire of the known art, due to the non-linearity of its thrust function associated with the vehicle inclination.

In addition to the above, the belt provided with zero-degree reinforcing elements, due to its greater flexibility, enables achievement of a ground-contacting area of the tire that increases on braking, with the result that less braking distance is required by the vehicle, thus improving driving safety.

A person skilled in the art will be able, once he has understood the invention as previously described, to carry out all choices, alternative solutions and modifications of the variables associated with the invention that may be necessary for him to solve the specific technical problem he has to cope with.

I claim:

1. A system of two tires for two-wheeled vehicles, said tires comprising a radial carcass of toric form of high transverse curvature, having a central crown and two sidewalls terminating with a pair of beads for anchoring the tire to a corresponding mounting rim, a tread band applied crown-wise to said carcass and a circumferentially inextensible belt structure, interposed between said carcass and said tread band, wherein:

the belt structure of the rear tire comprises at least one radially outer layer formed of a plurality of axially side-by-side circumferential coils of a cord wound at a substantially zero angle with respect to the equatorial plane of the tire, the belt structure of the front tire comprises at least one radially outer layer provided with a plurality of cord coils, disposed at a substantially zero angle with respect to the equatorial plane of the tire, axially distributed with a varying density from one end to the other end of said belt.

2. A system of two tires for two-wheeled vehicles according to claim 1, wherein said tires have a curvature ratio not lower than 0.3, the rear tire having a curvature ratio lower than the front tire.

3. A system of two tires for two-wheeled vehicles according to claim 1, wherein said at least one radially outer layer of the belt structure in the rear tire is formed of a narrow band of rubberized fabric comprising 1 to 5 metallic cords, of the high-elongation type, spiralled on said carcass, from one end to the other end of said crown portion, at an angle of a substantially zero value with respect to the equatorial plane of the tire.

4. A system of two tires for two-wheeled vehicles according to claim 1, wherein said cord coils of the at least one radially outer layer in the belt structure of the front tire are coils of high-elongation metallic cords made of high-carbon steel wires.

5. A system of two tires for two-wheeled vehicles according to claim 4, wherein the density of said cord coils in the front tire continuously increases from the equatorial plane to the belt ends, said density being of a value not exceeding 8 cords/cm at a unit width area located on either side of the equatorial plane.

6. A system of two tires for two-wheeled vehicles according to claim 1, wherein the cord coils of said at least one radially outer layer in the belt structure of at least one of said tires are wound on at least another belt structure reinforcing layer in a radially inner position.

7. A system of two tires for two-wheeled vehicles according to claim 6, wherein said at least one radially inner layer in the belt structure of at least one of said tires is broken at the equatorial plane of the tire over a portion of a width included between 10% and 30% of the axial extension of said belt.

8. A system of two tires for two-wheeled vehicles according to claim 6, wherein said at least one radially inner layer in the belt structure of at least one of said tires is made up of a sheet of elastomeric material, interposed between the belt structure and the carcass, comprising bonding means dispersed in the elastomeric material of said sheet.

9. A system of two tires for two-wheeled vehicles according to claim 8, wherein said bonding means are reinforcing fibrous fillings.

10. A system of two tires for two-wheeled vehicles according to claim 9, wherein said reinforcing fibrous fillings are short fibril-structure aramid fibers.

11. A system of two tires for two-wheeled vehicles according to claim 10, wherein said short fibril-structure aramid fibers are homogeneously dispersed in said elastomeric material with a density per unit volume included between 0.5% and 5% of the overall volume.

12. A system of two tires for two-wheeled vehicles according to claim 9, wherein said reinforcing fibrous fillings are oriented along a preferential direction, circumferential or inclined to said equatorial plane.

13. A system of two tires for two-wheeled vehicles according to claim 6, wherein in the belt structure of the front tire said at least one radially inner layer is comprised of axially facing strips provided with reinforcing elements oriented in inclined directions in each strip and opposite to each other in said strips relative to the equatorial plane of the tire.

14. A system of two tires for two-wheeled vehicles according to claim 13, wherein the reinforcing elements in said at least one radially inner layer are selected from the group consisting of textile cords and metallic cords.

15. A system of two tires for two-wheeled vehicles according to claim 13, wherein in the belt structure of the front tire said at least one radially inner layer comprises two radially overlapping strips on each side of the equatorial plane, which are provided with reinforcing elements oriented in inclined directions in each strip and opposite to each other in the two strips, relative to the equatorial plane of the tire.

16. A system of two tires for two-wheeled vehicles according to claim 15, wherein the reinforcing elements in one of said strips are of a different material than the reinforcing elements in the adjacent strip in the radial direction.

17. A system of two tires for two-wheeled vehicles according to claim 6, wherein said at least one radially inner layer in the belt structure of at least one of said tires comprises two radially overlapped layers of reinforcing elements inclined opposite to each other with respect to the tire equatorial plane where between 10% and 30% of the width is lower in stiffness.

18. A system of two tires for two-wheeled vehicles according to claim 6, wherein said at least one radially inner layer in the belt structure of at least one of said tires comprises a layer which is broken at the equatorial plane of the tire over a portion of a width included between 10% and 30% of the axial extension of said belt.

19. A system of two tires for two-wheeled vehicles according to claim 1, wherein said tires each have a curvature ratio not lower than 0.3.

20. A method of controlling the overall slip thrust in a system of two tires mounted on a two-wheeled motor-vehicle, said tires comprising a radial carcass of toric form of high transverse curvature having a central crown and two sidewalls terminating with a pair of beads anchoring the tire to a corresponding mounting rim, a tread band applied crown-wise to said carcass and a circumferentially-inextensible belt structure interposed between said carcass and tread band, said method comprising mounting on said motor-vehicle:

a rear tire of said two tires provided with a belt structure comprising at least one radially outer layer formed of a plurality of axially side-by-side circumferential coils of a cord wound at a substantially zero angle with respect to the equatorial plane of the tire, and a front tire of said two tires provided with a belt structure comprising at least one radially outer layer provided with a plurality of cord coils disposed at a substantially zero angle with respect to the equatorial plane of the tire, axially distributed with a varying density from one end to the other end of said belt.

21. A method according to claim 20, wherein the number of coils and their distribution along the axial extension of each belt structure being such that the behaviors of the two tires are combined with each other to achieve a neutral behavior of the motor-vehicle in slip.

* * * * *